(12) United States Patent
Jungwirth et al.

(10) Patent No.: US 10,509,110 B2
(45) Date of Patent: Dec. 17, 2019

(54) VARIABLE RESOLUTION LIGHT RADAR SYSTEM

(71) Applicant: The Boeing Company, Chicago, IL (US)

(72) Inventors: Douglas R. Jungwirth, Los Angeles, CA (US); Anton M. Bouckaert, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 1027 days.

(21) Appl. No.: 14/982,416

(22) Filed: Dec. 29, 2015

(65) Prior Publication Data

US 2018/0364333 A1   Dec. 20, 2018

(51) Int. Cl.
| | |
|---|---|
| G01S 7/481 | (2006.01) |
| G01S 17/42 | (2006.01) |
| G01S 7/497 | (2006.01) |
| G01B 11/26 | (2006.01) |
| G01S 17/89 | (2006.01) |
| G01S 17/93 | (2006.01) |

(52) U.S. Cl.
CPC ............ *G01S 7/4817* (2013.01); *G01B 11/26* (2013.01); *G01S 7/4814* (2013.01); *G01S 7/497* (2013.01); *G01S 17/42* (2013.01); *G01S 17/89* (2013.01); *G01S 17/936* (2013.01)

(58) Field of Classification Search
CPC .................................. G01S 17/93; G01S 13/86
USPC ......................................................... 342/54
See application file for complete search history.

(56) References Cited

U.S. PATENT DOCUMENTS

| | | | |
|---|---|---|---|
| 5,243,541 | A | 9/1993 | Ulich |
| 6,147,747 | A | 11/2000 | Kavaya et al. |
| 6,208,270 | B1 | 3/2001 | Dunn |
| 7,544,945 | B2 * | 6/2009 | Tan ........................ G01S 7/4811 180/169 |
| 2003/0123045 | A1 | 7/2003 | Riegel et al. |
| 2006/0153558 | A1 | 7/2006 | Tan et al. |
| 2006/0227317 | A1 * | 10/2006 | Henderson ........... G01B 11/026 356/28 |
| 2007/0195393 | A1 * | 8/2007 | Yamada ................ G01S 7/4811 359/196.1 |
| 2007/0272841 | A1 | 11/2007 | Wiklof |
| 2010/0172136 | A1 * | 7/2010 | Williamson, III ...... F41H 13/00 362/259 |
| 2013/0182239 | A1 * | 7/2013 | Kaiser .................. G01S 7/4811 356/4.01 |

(Continued)

OTHER PUBLICATIONS

Extended European Search report, dated Jun. 6, 2017, regarding Application No. 16205116.3, 8 pages.

(Continued)

*Primary Examiner* — Marcus E Windrich
(74) *Attorney, Agent, or Firm* — Yee & Associates, P.C.

(57) ABSTRACT

A method and apparatus for scanning a target region. A divergence of a laser beam during scanning of the target region is set. The laser beam is directed to different locations in the target region at a scan angle. The scan angle of the laser beam is set while the laser beam is directed to the different locations. Changing at least one of the divergence or an amount of change in the scan angle during scanning of the target region changes a resolution for the target region.

22 Claims, 11 Drawing Sheets

(56) References Cited

U.S. PATENT DOCUMENTS

| | | | | |
|---|---|---|---|---|
| 2013/0241761 A1* | 9/2013 | Cooper | ............... | G01S 7/4812 |
| | | | | 342/54 |
| 2013/0241762 A1* | 9/2013 | Smith | ................... | G01S 17/42 |
| | | | | 342/54 |
| 2015/0378023 A1* | 12/2015 | Royo Royo | ......... | G01S 7/4817 |
| | | | | 356/5.01 |

OTHER PUBLICATIONS

European Patent Office Communication Report, dated Nov. 16, 2018, regarding Application No. 16205116.3, 5 pages.

* cited by examiner

VARIABLE RESOLUTION LIGHT RADAR SYSTEM

BACKGROUND INFORMATION

1. Field

The present disclosure relates generally to measurement systems, and in particular, to measurement systems that use light. Still more particularly, the present disclosure relates to a method and apparatus for radar systems generating measurement information using light radar (lidar) systems.

2. Background

Lidar is a sensing technology that measures distance by illuminating a target with a laser and analyzing responses to the illumination of the target. The word "lidar" is portmanteau of the words "laser" and "radar", rather than an acronym.

Lidar systems are used for many different applications. For example, lidar systems may be used in seismology, point cloud generation, mapping, contour mapping, image generation, navigation, and other applications.

With respect to navigation, a lidar system may be used for obstacle detection and avoidance when navigating a mobile platform through an environment. For example, a point cloud of the environment may be generated by a lidar system that provides information for determining where obstacles may exist. The mobile platform may be, for example, a robot, a self-navigating car, or some other suitable type of vehicle.

Currently used lidar systems generate a pattern in a target region using a laser beam that has a substantially uniform beam divergence in the target region. In other words, the laser beam has the same diameter at the same distances from the lidar system.

These types of lidar systems, however, provide only one resolution throughout the entire scan. The target region, however, may be limited by the pulse rate and power of the lidar system. Increasing the size of the target region may result in a lower resolution. As a result, having a desired size for a target region may not be possible with a desired resolution.

Therefore, it would be desirable to have a method and apparatus that take into account at least some of the issues discussed above, as well as other possible issues. For example, it would be desirable to have a method and apparatus that overcome a technical problem with obtaining information about a target region with a desired resolution.

SUMMARY

An embodiment of the present disclosure provides an apparatus comprising a light source, a scanning system, and a focusing system. The light source emits a laser beam during an operation of the light source. The scanning system directs the laser beam to a target region and sets a scan angle of the laser beam while scanning of target region occurs. The focusing system sets a divergence of the laser beam while scanning of the target region occurs. Changing at least one of an amount of change in the scan angle or the divergence of the laser beam while scanning the target region changes a resolution within the target region.

A further illustrative embodiment of the present disclosure provides a method for scanning a target region. A divergence of a laser beam during scanning of the target region is set. The laser beam is directed to different locations in the target region at a scan angle. The scan angle of the laser beam is set while the laser beam is directed to the different locations. Changing at least one of the divergence or an amount of change in the scan angle during scanning of the target region changes a resolution for the target region.

A yet further illustrative embodiment of the present disclosure provides a measurement system comprising a light source, a scanning system, and a focusing system. The light source emits a beam of substantially coherent light. The scanning system directs the beam of substantially coherent light to a target region and sets a scan angle for the beam of substantially coherent light. The focusing system adjusts a divergence of the beam of substantially coherent light while scanning of the target region occurs. Changing at least one of an amount of change in the scan angle or the divergence of the beam of coherent light while scanning the target region changes a resolution within the target region.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
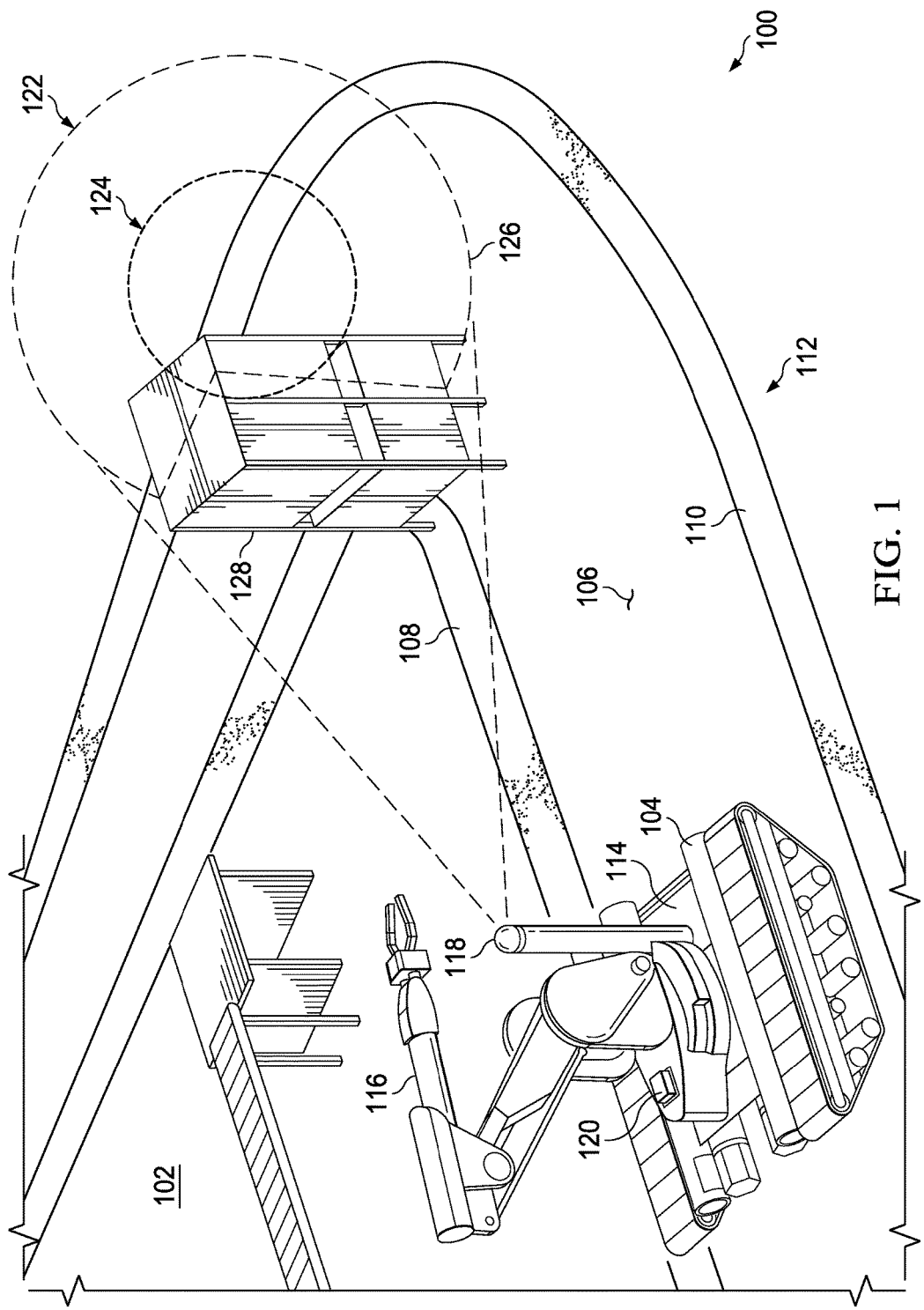
FIG. 1 is a pictorial illustration of a measurement environment in accordance with an illustrative embodiment.

The illustrative embodiments recognize and take into account one or more different considerations. For example, the illustrative embodiments recognize and take into account that in some applications, different resolutions may be desired for different portions of a target region that is being scanned.

For example, when navigating an autonomous mobile platform such as a robot, a high resolution is desired on the path in the direction of travel for the robot while a low resolution is appropriate for the periphery around the path. As a result, one lidar system may be used with a high resolution while a second lidar system may be used with a low resolution.

The illustrative embodiments recognize and take into account that the resolution requires more than one lidar system and may use more power, have a greater cost, and more complexity than a single lidar system. For example, the illustrative embodiments recognize and take into account that with an autonomous mobile robot, the power may be a valuable resource that should be conserved. The autonomous mobile robot may include a power supply in the form of a battery system. The use of a battery system limits the amount of power that is available to operate the autonomous mobile robot. As a result, the greater use of power with multiple lidar systems or a lidar system that is able to emit more pulses per minute may result in a decreased operating time for the autonomous mobile robot.

The illustrative embodiments also recognize and take into account that it would be desirable to have a lidar system that is capable of providing different resolutions in a target region without changing the frame rate. The frame rate is the number of scans of the target region that may be performed over a period of time. For example, the frame rate may be 30 frames per second, 60 frames per second or some other rate.

The frame rate may be limited in a lidar system by how fast the laser in the lidar system is able to generate pulses. As the resolution increases, more locations are scanned, which means more pulses need to be emitted in the same amount of time to scan a target region with the same frame rate.

The illustrative embodiments recognize and take into account that using lower resolutions in some areas and higher resolutions in other areas may allow for scanning a target region with a lower number of emissions of a laser as compared to scanning the target region only with a high resolution. Further, the illustrative embodiments also recognize and take into account that scanning with a uniform resolution may sometimes miss objects in a target region. In other words, the uniform resolution may result in blind spots if the divergence of the laser beam results in gaps between locations covered by the laser in the target region. Therefore, the illustrative embodiments recognize and take into account that it may be desirable to have different resolutions in different portions of the target region to reduce blind spots.

Thus, the illustrative embodiments provide a method and apparatus in which at least one of the amount of change in the scan angle or the divergence of the laser beam may be varied during a scan of the target region. The scan of the target region results in a frame.

As used herein, the phrase "at least one of", when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B and ten of item C; four of item B and seven of item C; or other suitable combinations.

The illustrative embodiments provide a method and apparatus that scan a target region with different resolutions. For example, in the same scan, a higher resolution is present in one or more areas of interest within the target region and a lower resolution is present in other areas in the target region. In one illustrative example, a measurement system comprises a coherent light source, a scanning system, and a focusing system.

The scanning system directs the laser beam to a target region and sets a scan angle of the laser beam while scanning of target the region occurs. The focusing system sets a divergence of the laser beam while scanning of the target region occurs. Changing at least one of the amount of change in the scan angle or the divergence of the laser beam while scanning the target region changes a resolution within the target region.

With reference now to the figures and, in particular, with reference to FIG. 1, a pictorial illustration of a measurement environment is depicted in accordance with an illustrative embodiment. In this illustrative example, measurement environment 100 includes manufacturing facility 102 in which autonomous mobile robot 104 operates. In this illustrative example, autonomous mobile robot 104 moves along path 106. Path 106 is defined by stripe 108 and stripe 110 on floor 112 in manufacturing facility 102. Stripe 108 and stripe 110 may be formed using paint, tape, or some other material that may be used by autonomous mobile robot 104 to navigate through manufacturing facility 102.

As depicted, autonomous mobile robot 104 comprises mobile platform 114, robotic arm 116, lidar system 118, and controller 120. Mobile platform 114 provides locomotion for autonomous mobile robot 104. Robotic arm 116 may be used to perform manufacturing operations in manufacturing facility 102. Lidar system 118 generates information about the environment around autonomous mobile robot 104. Controller 120 controls the operation of autonomous mobile robot 104.

In this illustrative example, lidar system 118 scans target region 122. As depicted, central portion 124 of target region 122 is directly ahead of autonomous mobile robot 104 and is in the direction of travel of autonomous mobile robot 104. Peripheral portion 126 includes the area outside of central portion 124. Central portion 124 has a higher resolution as compared to peripheral portion 126 of target region 122.

The higher resolution in central portion 124 allows for controller 120 to identify object 128 that obstructs path 106. The lower resolution in peripheral portion 126 is sufficient for detecting the presence of objects that may not be directly in front of autonomous mobile robot 104. In this manner, controller 120 may navigate autonomous mobile robot 104 around obstacles such as object 128 that may be on path 106.

Figure 2:
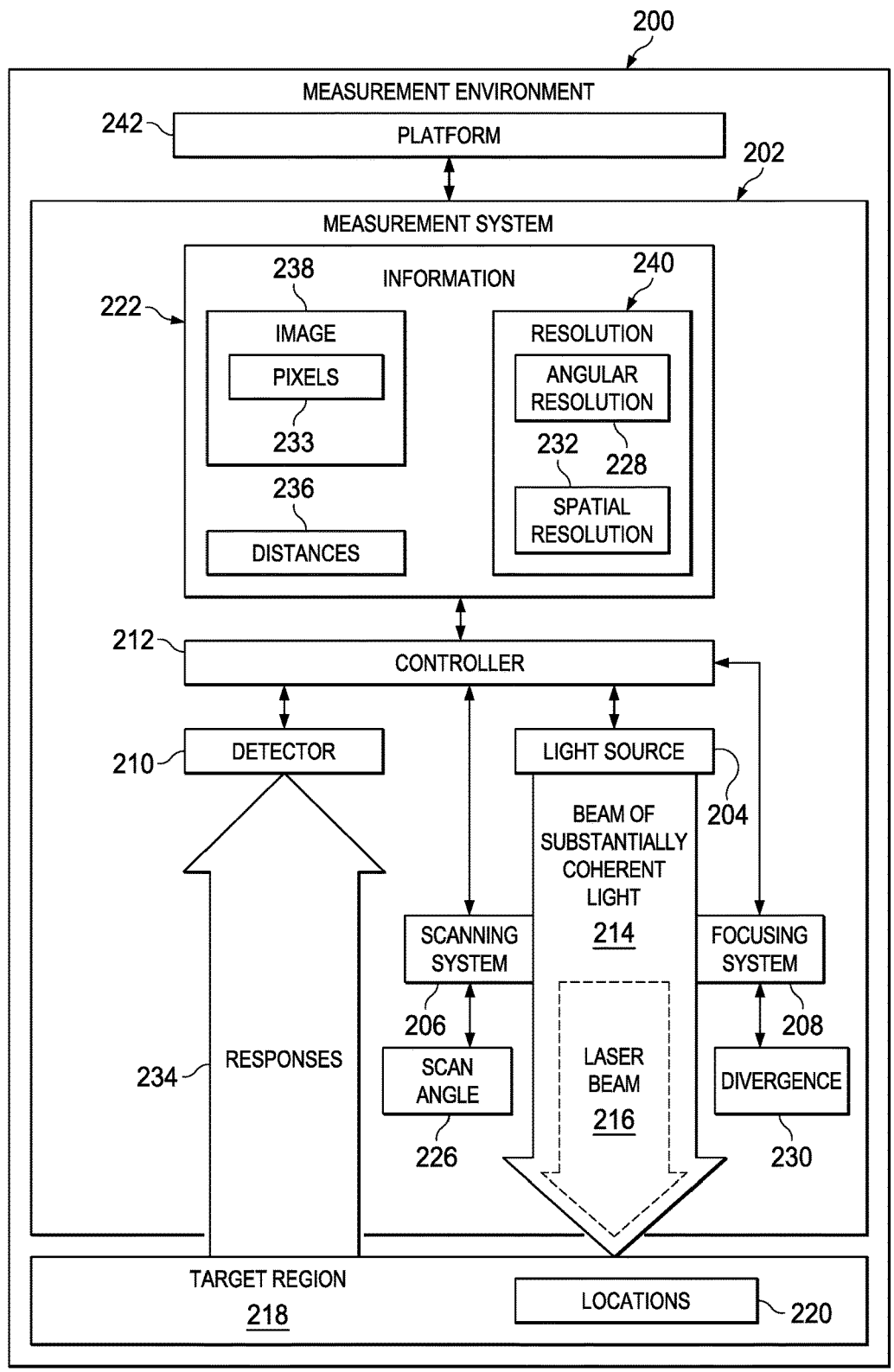
FIG. 2 is an illustration of a block diagram of a measurement environment in accordance with an illustrative embodiment.

With reference now to FIG. 2, an illustration of a block diagram of a measurement environment is depicted in accordance with an illustrative embodiment. Measurement environment 100 is an example of one implementation for measurement environment 200 shown in block form in FIG. 2.

In this illustrative example, measurement environment 200 includes measurement system 202. As depicted, measurement system 202 includes light source 204, scanning system 206, focusing system 208, detector 210, and controller 212.

Light source 204 emits beam of substantially coherent light 214. In the illustrative example, light source 204 emits beam of substantially coherent light 214 in the form of laser beam 216 during operation of light source 204.

In one illustrative example, laser beam 216 may have a wavelength selected from about from about 10 nm to about 700 nm. Other wavelengths or ranges of weight may be used depending on the implementation. For example, the wavelength may be from about 250 nm to about 1000 nm in some implementations.

Further, light source 204 emits laser beam 216 as one of a continuous laser beam and a pulsed laser beam. When laser beam 216 is a continuous laser beam, laser beam 216 may be modulated, such as a frequency modulated continuous wave (FMCW) laser beam.

As depicted, scanning system 206 directs laser beam 216 to target region 218. In particular, scanning system 206 directs laser beam 216 to locations 220 in target region 218.

Target region 218 is a region for which information 222 is desired. Target region may have various shapes. For example, target region 218 may have a shape selected from a circle, a square, a rectangle, a trapezoid, an oval, a polygon, a pentagon, a hexagon, a rhombus, a regular polygon, an irregular polygon, a regular shape, an irregular shape, or some other suitable shape.

As depicted, scanning system 206 operates to set scan angle 226 of laser beam 216 while scanning of target region 218 occurs. Scan angle 226 is an angle of laser beam 216 with respect to a reference from which the angle of laser beam is measured. Scan angle 226 of laser beam 216 is measured from scanning system 206 towards target region 218.

Each location in locations 220 reached by laser beam 216 has a scan angle relative to scan angles for other locations in locations 220. Scan angle 226 for laser beam 216 changes such that laser beam 216 moves from one location to another location in locations 220.

For example, scan angle 226 may be increased by 1 to move laser beam 216 from the first location to a second location. The 1 degree increase in scan angle 226 is an amount of change in scan angle 226.

The amount of change in scan angle 226 from one location to another location may change resulting in a change in angular resolution 228 for information 222 about target region 218. Angular resolution 228 is the measure of an angle with respect to the ability to distinguish between different objects. For example, angular resolution 228 is the minimum angle of separation at which two equal targets can be distinguished from each other at the same range.

As the amount of the change in scan angle 226 increases, angular resolution 228 decreases. As the amount of the change in scan angle 226 decreases, angular resolution 228 increases.

For example, the change in scan angle 226 may increase the scan angle by 0.5 degrees. The change in scan angle 226 may then increase the scan angle by 1 degree. The 1 degree change in scan angle 226 results in a lower angular resolution as compared to the 0.5 degree change in scan angle 226.

In the illustrative example, focusing system 208 sets divergence 230 of laser beam 216 while scanning of target region 218 occurs. Changing divergence 230 of laser beam 216 changes spatial resolution 232 of information 222. As divergence 230 increases, spatial resolution 232 decreases, and as divergence 230 decreases, spatial resolution 232 increases.

Spatial resolution 228 is a measure of detail and may be expressed as the number of pixels 233 that may be present in information 222 for target region 218. The measure may be pixels per line, dots per inch, or some other measure. As depicted, divergence 230 affects the pixels per line and dots per inch.

Detector 210 detects responses 234 to laser beam 216 being directed to locations 220 in target region 218. Distances 236 to locations 220 in target region 218 are identified using responses 234 and are part of information 222.

In this illustrative example, controller 212 controls the operation components of measurement system 202, such as light source 204, scanning system 206, focusing system 208, and detector 210. For example, controller 212 controls scanning system 206 and focusing system 208 to set at least one of scan angle 226 or divergence 230 for laser beam 216.

As depicted, controller 212 is in communication with detector 210. Controller 212 identifies information 222 about target region 218 based on responses 234 detected by detector 210.

For example, controller 212 may identify distances 236 to locations 220. Distances 236 to locations 220 in target region 218 also may be identified using at least one of a time-of-flight (TOS), intensities of responses 234, or other information using responses 234.

Distances 236 from a scan of target region 218 may be used to generate image 238. Pixels 233 in image 238 correspond to locations 220.

As depicted, the rate at which images 238 may be generated from scanning target region 218 is measured as a frame rate. The frame rate may be in frames per second (FPS).

Changing the amount of change in scan angle 226 or divergence 230 during scanning of target region 218 changes resolution 240 within target region 218. Resolution 240 includes at least one of angular resolution 228 or spatial resolution 232. By changing at least one of the amount of change in scan angle 226 and angular resolution 228, different resolutions may be present for target region 218. As a result, different resolutions may be present within image 238.

Higher and lower resolutions may be selected within target region 218 to maintain a desired frame rate if the rate at which laser beam 216 is emitted limits the frame rate for target region 218. For example, light source 204 may only be able to emit a maximum of 1000 pulses per second. With this rate of emission, light source 204 is able to include 1000 locations in a scan of target region 218 with a frame rate of 1 frame per second.

If the 1000 locations for target region 218 is insufficient for desired coverage at a selected divergence and at the amount of change in scan angle 226, additional locations may be added to locations 220. Adding to locations 220, however, reduces the frame rate.

With measurement system 202, scanning system 206 controls scan angle 226 of laser beam 216 and focusing system 208 to change at least one of the amount of change in scan angle 226 or divergence 230 of laser beam 216 while scanning of target region 218. Changing at least one of the amount of change in scan angle 226 or divergence 230 of laser beam 216 while scanning target region 218 changes resolution 240. As depicted, resolution 240 includes at least one of angular resolution 228 or spatial resolution 232.

The change in resolution 240 during scanning of target region 218 may allow for laser beam 216 to be directed to locations 220 without increasing the number of locations 220. The change may also allow scanning of locations 220 without reducing the frame rate.

Controller 212 may be implemented in software, hardware, firmware or a combination thereof. When software is used, the operations performed by controller 212 may be implemented in program code configured to run on hardware, such as a processor unit. When firmware is used, the operations performed by controller 212 may be implemented in program code and data and stored in persistent memory to run on a processor unit. When hardware is employed, the hardware may include circuits that operate to perform the operations in controller 212.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Thus, measurement system 202 operates as a variable resolution light radar (lidar) system. In the illustrative example, measurement system 202 may be associated with platform 242. When one component is "associated" with another component, the association is a physical association. For example, a first component, measurement system 202, may be considered to be physically associated with a second component, platform 242, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

As depicted, platform 242 may take different forms. For example, platform 242 may be selected from one of a mobile platform, a stationary platform, a land-based structure, an aquatic-based structure, a space-based structure, an autonomous mobile robot, a vehicle, a self-driving car, an aircraft, an unmanned aerial vehicle, a surface ship, a tank, a personnel carrier, a spacecraft, a space station, a handheld device, a wearable device, a satellite, or some other suitable platform.

When platform 242 is a mobile robot, target region 218 may be in the direction of travel of the mobile robot. As depicted, controller 212 also may control operation of platform 242. Information 222 may be used by controller 212 to control movement of the mobile robot to reach a destination location while avoiding obstacles.

In another example, target region 218 may be where a work piece is located. Information 222 may be used by the mobile robot to perform a manufacturing operation on the work piece, such as drilling a hole, applying sealant, installing fasteners, or some other suitable operation.

In yet another example, platform 242 may be a self-driving car and target region 218 may be the road ahead of the self-driving car. Information 222 may be used to identify obstacles, such as other cars, on the road and locations of exits, signs and other objects to the side of the road. With information 222 about distance, the self-driving car may navigate to a destination, maintain the position of the self-driving car in a lane of a road, or perform some other operation.

Thus, the illustrative example provides one or more technical solutions to a technical problem with obtaining information about a target region with a desired resolution. By varying the resolution within a target region, a higher resolution may be obtained for one or more portions of interest in the target region. Lower resolutions may be used for other portions in the target region. As a result, a technical effect of one or more technical solutions is an ability to maintain a rate at which scans of the target region may be performed when the light source limits the rate when all of the target region is scanned at a higher resolution.

Figure 3:
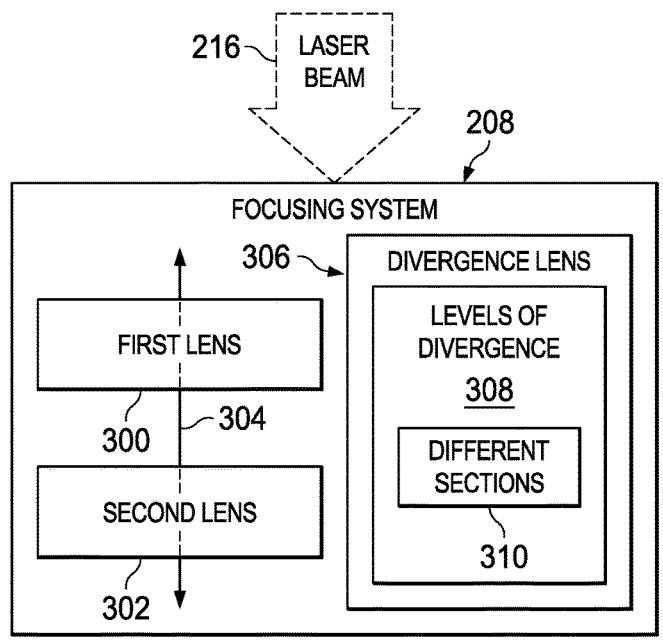
FIG. 3 is an illustration of a block diagram of a focusing system in accordance with an illustrative embodiment.

With reference next to FIG. 3, an illustration of a block diagram of a focusing system is depicted in accordance with an illustrative embodiment. In the illustrative examples, the same reference numeral may be used in more than one figure. This reuse of a reference numeral in different figures represents the same element in the different figures. In the illustrative example, focusing system 208 may have a number of different configurations.

For example, focusing system 208 may be comprised of first lens 300 and second lens 302 aligned on optical axis 304. First lens 300 and second lens 302 form a variable focus lens system. Optical axis 304 extends centrally though first lens 300 and second lens 302.

As depicted, second lens 302 is moveable on optical axis 304 relative to first lens 300. In this depicted example, second lens 302 is selected from one of a convergent lens and a divergence lens.

Laser beam 216 passes through first lens 300 along optical axis 304. Laser beam 216 then passes through second lens 302 after passing through first lens 300. Divergence 230 of laser beam 216 is changed by moving second lens 302 along optical axis 304 relative to first lens 300.

In another illustrative example, focusing system 208 may include divergence lens 306 in addition to or in place of first lens 300 and second lens 302. As depicted, divergence lens 306 lens has different levels of divergence 308 in different sections 310 of divergence lens 306.

Divergence 230 of laser beam 216 for a location in target region 218 is set based on which section in different sections 310 that laser beam 216 passes through divergence lens 306. For example, scanning system 206 directs laser beam 216 to different sections 310 of divergence lens 306 such that divergence 230 of laser beam 216 changes in addition to laser beam 216 being directed to locations 220 in target region 218 in FIG. 2. In other words, laser beam 216 may be through different sections 310 of divergence lens 306 such that divergence 230 of laser beam 216 changes based on which section of divergence lens 306 laser beam 216 passes.

Divergence lens 306 may be implemented using different types of lenses. For example, divergence lens 306 may be selected from one of a spherical lens, a cylindrical lens, an aspherical lens, or some other suitable type of lens.

Figure 4:
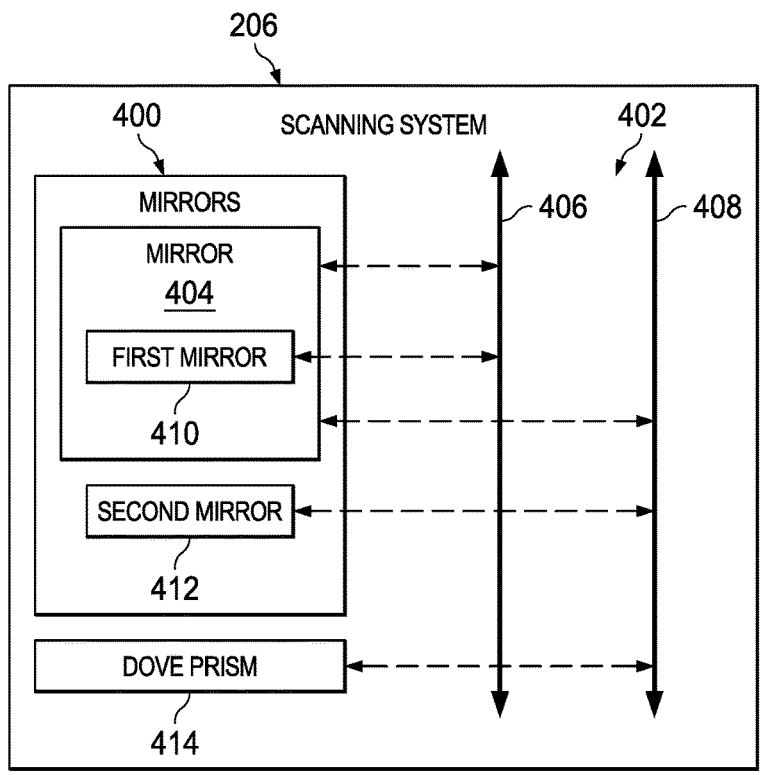
FIG. 4 is an illustration of a block diagram of a scanning system in accordance with an illustrative embodiment.

Turning next to FIG. 4, an illustration of a block diagram of a scanning system is depicted in accordance with an illustrative embodiment. In the illustrative example, scanning system 206 may have a number of different configurations.

In one illustrative example, scanning system 206 comprises a number of mirrors 400 moveable about a number of axes 402. As used herein, a "number of" when used with reference with items mean one or more items. For example, a number of mirrors 400 is one or more of mirrors 400.

In one illustrative example, the number of mirrors 400 may be mirror 404 that rotates about first axis 406 and second axis 408. In this manner, laser beam 216 may be directed to scan locations 220 in target region 218.

In another illustrative example, mirror 404 is first mirror 410 and scanning system 206 includes second mirror 412. First mirror 410 rotates about first axis 406 and second mirror rotates about second axis 408.

In yet another illustrative example, scanning system 206 includes dove prism 414. Dove prism 414 may be used in place of second mirror 412 and rotates about second axis 408 to direct laser beam 216.

The illustration of measurement environment 200 and the different components in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, measurement system 202 also may include a power supply or a connection to a power source. As another example, controller 212 is shown as a separate component from measurement system 202.

In some illustrative examples, controller 212 may be part of measurement system 202. Further, controller 212 may be distributed in more than one physical location. For example, a first part of controller 212 may be located in measurement system 202 and may control measurement system 202, while a second part of controller 212 may be located outside of measurement system 202 and platform 242. For example, the second part of controller 212 may be associated with platform 242 or in a remote location to measurement system 202 and platform 242.

As another example, focusing system 208 in FIG. 3 may also include a motor or actuator system to move second lens 302 along optical axis 304. Additionally, scanning system 206, as depicted in FIG. 4, may also include a motor system that rotates first mirror 410, second mirror 412, and dove prism 418.

Figure 5:
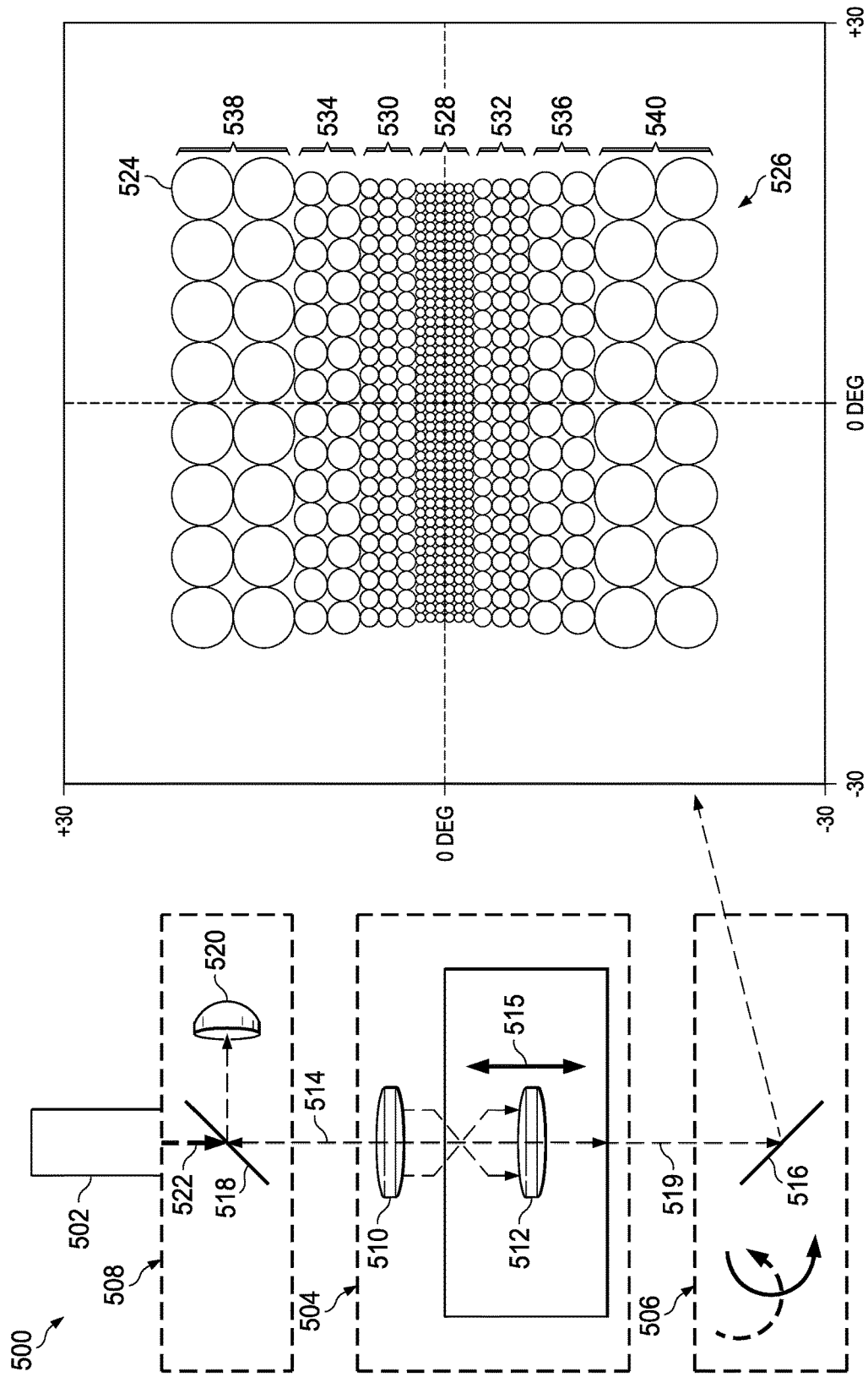
FIG. 5 is an illustration of a measurement system in accordance with an illustrative embodiment.

Turning to FIG. 5, an illustration of a measurement system is depicted in accordance with an illustrative embodiment. In this illustrative example, measurement system 500 is an example of an implementation of measurement system 202 shown in block form in FIG. 2.

As depicted, measurement system 500 includes laser 502, focusing system 504, scanning system 506, and detector 508. Laser 502 is an example of light source 204; focusing system 504 is an example of focusing system 208; scanning system 506 is an example of scanning system 206; and detector 508 is an example of detector 210.

In this illustrative example, focusing system 504 includes first lens 510 and second lens 512. First lens 510 and second lens 512 are positioned on optical axis 514. As depicted, first lens 510 is fixed and second lens 512 is movable along optical axis 514 in the direction of arrow 515.

As depicted, scanning system 506 includes scanning mirror 516. In this illustrative example, scanning mirror 516 is rotatable about two axes.

Detector 508 includes a number of different components. As depicted, detector 508 includes one-way mirror 518 and photodetector unit 520.

During operation, laser 502 emits laser beam 522 in pulses. The pulses for laser beam 522 travel through one way mirror 518 and then through first lens 510 and second lens 512 on path 519. Second lens 512 may be moved to change the divergence of laser beam 522.

Thereafter, laser beam 522 reaches scanning mirror 516. Scanning mirror 516 rotates to direct laser beam 522 to target region 524 on path 519. As depicted, target region 524 has a rectangular shape. Different locations in locations 526 in target region 524 are reached by laser beam 522 by changing the scan angle of laser beam 522 through rotation of scanning mirror 516.

Laser 502 is controlled to time pulses such that each pulse for laser beam 522 reaches a different one of locations 526. Changing the scan angle of laser beam 522 changes path 519 to reach different ones of locations 526 during a scan of target region 524.

In this illustrative example, locations 526 and target region 524 are scanned by laser beam 522 with responses (not shown) returning to scanning mirror 516 and being directed through first lens 510 and second lens 512 to one-way mirror 518 along path 519. One way mirror 518 directs the response to photodetector unit 520.

As depicted, a single scan of target region 524 may be performed to obtain distance information about target region 524. Further, the amount or size of change in degrees between each location may be changed by scanning mirror 516 during the scan of target region 524.

This change may be used to vary the angular resolution that changes path 519 to target region 524. The information from a single scan of target region 524 may be used to form an image, which is one frame from the single scan of target region 524.

Additionally, the divergence of laser beam 522 may be changed during scanning of target region 524. This change may be formed by moving second lens 512 relative to first lens 510. Changing the divergence of laser beam 522 changes the diameter of laser beam 502 at a particular distance from focusing system 504. The change in divergence changes the spatial resolution. In the illustrative example herein, at least one of the change in the scan angle or the divergence of laser beam 522 is set such that a change in a number of degrees in the scan angle from one location to another location in locations 526 in target region 524 is about equal to a number of degrees for the divergence.

As depicted, each location in locations 526 in target region 524 shows a beam diameter at a particular distance from measurement system 500. Beam diameter is set by the divergence of laser beam 522 as controlled by focusing system 504. As shown in this example, when the size of change in the scan angle increases, the divergence of laser beam 522 also increases such that the diameter of laser beam 522 also increases. In other words, the change in divergence is based on the change in the scan angle.

In this manner, the diameter of laser beam 522 may be controlled to cover target region 524 in a manner that reduces the possibility that an object may be located between beam diameters in a blind spot in target region 524.

The resolution for locations 526 in target region 524 may change in the same scan of target region 524.

As depicted, locations 526 in target region 524 have the highest scanning density within section 528 in target region 524. In other words, the density of locations 526 is the highest and the diameter of laser beam 522 is the smallest in this section. Section 528 has the highest resolution in target region 524. The amount of change in the scan angle and the divergence of laser beam 522 is the smallest for locations 526 in section 528 as compared to other parts of target region 524.

Locations 526 in section 530 and section 532 have the next smallest amount of change in the scan angle and the next smallest amount of divergence of laser beam 522. The density of locations 526 in section 530 and section 532 are smaller than section 528. Further, the resolution of section 530 and section 532 is lower than section 528.

In this illustrative example, locations 526 in section 534 and section 536 have a larger change in the scan angle and a larger divergence as compared to locations 526 in section 530 and section 532. Section 534 and section 536 have a lower resolution than section 530 and section 532.

As depicted, locations 526 in section 538 and section 540 have the largest change in the scan angle and the largest divergence of laser beam 522. As a result, section 538 and section 540 have the lowest resolution in target region 524.

In this manner, the responses to laser beam 522 from locations 526 may provide a desired level of coverage within target region 524 using a lower number of locations 526 as compared to performing the scan using the scan angle and divergence shown in section 528. In other words, a fewer number of emissions of laser beam 522 may be used to substantially cover target region 524 as compared to using more emissions of laser beam 522 when the density of locations 526 is the same as in section 528 throughout target region 524.

By using a higher density scanning throughout target region 524, high-resolution information may be obtained. However, a lower frame rate may occur depending on the speed at which laser 502 is able to emit pulses of laser beam 522.

By using lower density scanning with greater divergence of laser beam 522 in regions outside of section 528, target region 524 may be covered in a desired manner while reducing the number of emissions of laser beam 522 by laser 502 needed to scan target region 524. As a result, a reduction of frame rate may be avoided as compared to maintaining a higher resolution throughout target region 524.

The sections in target region 524 for having higher and lower resolutions may be selected based on the particular reason for scanning target region 524. For example, when scanning a horizon of the earth for objects, section 528 may be located at the horizon. The higher resolution may allow for both detecting and identifying objects. The lower resolutions farther away from section 528 may identify the presence of an object or movement without identifying what objects are in target region 524. As another example, a section in target region 524 selected for high-resolution may be one for a road or path.

Figure 6:
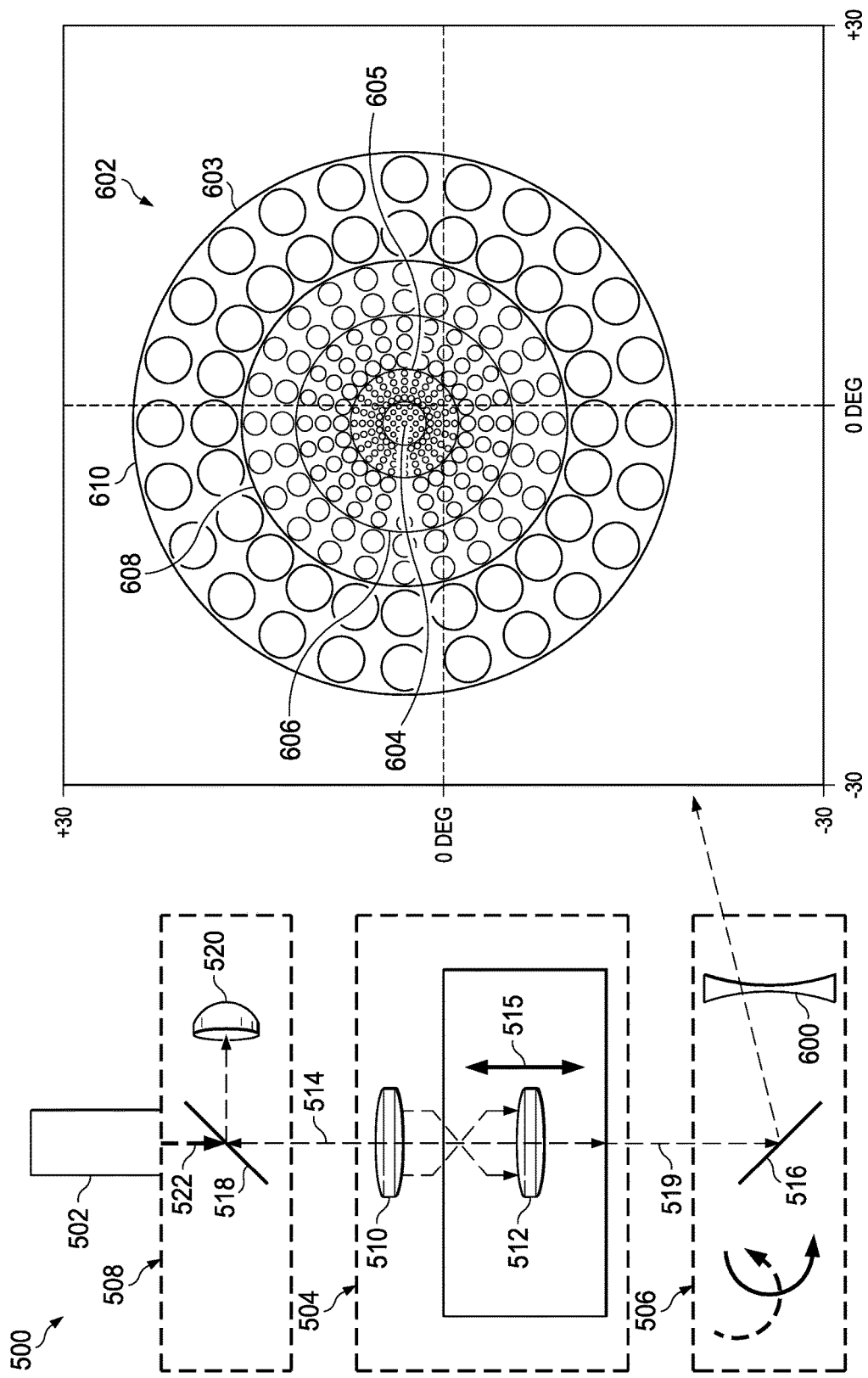
FIG. 6 is an illustration of a measurement system in accordance with an illustrative embodiment.

Turning to FIG. 6, an illustration of a measurement system is depicted in accordance with an illustrative embodiment. In this illustrative example, measurement system 500 is another example of an implementation of measurement system 202 shown in block form in FIG. 2.

In this example, scanning system 504 also includes lens 600. As depicted, lens 600 is used in this illustrative example to increase or decrease the deflection of laser beam 522 by scanning mirror 516.

In this example, laser beam 522 is directed to locations 602 in target region 603. As depicted, target region 603 has a circular shape, as compared to the rectangular shape of target region 524 in FIG. 5. In this example, the scan density decreases away from center 604 of target region 603.

As depicted, section 605 has the highest scan density with the highest density of locations 602. The change in the scan angle and the diversion of laser beam 522 is smallest in section 605. This section has the highest resolution in target region 603.

Section 606 has a lower density of locations 602 as compared to section 605. The resolution of this section is the next highest in target region 603. Section 608 has a lower density of locations 602 as compared to section 606. In other words, the change in the scan angle and the divergence are greater as compared to section 606.

Section 610 has a lower scan density than section 608. The resolution in section 610 is lower than in section 608. Section 610 has the lowest scan density and the lowest density of locations 602 in target region 603.

Figure 7:
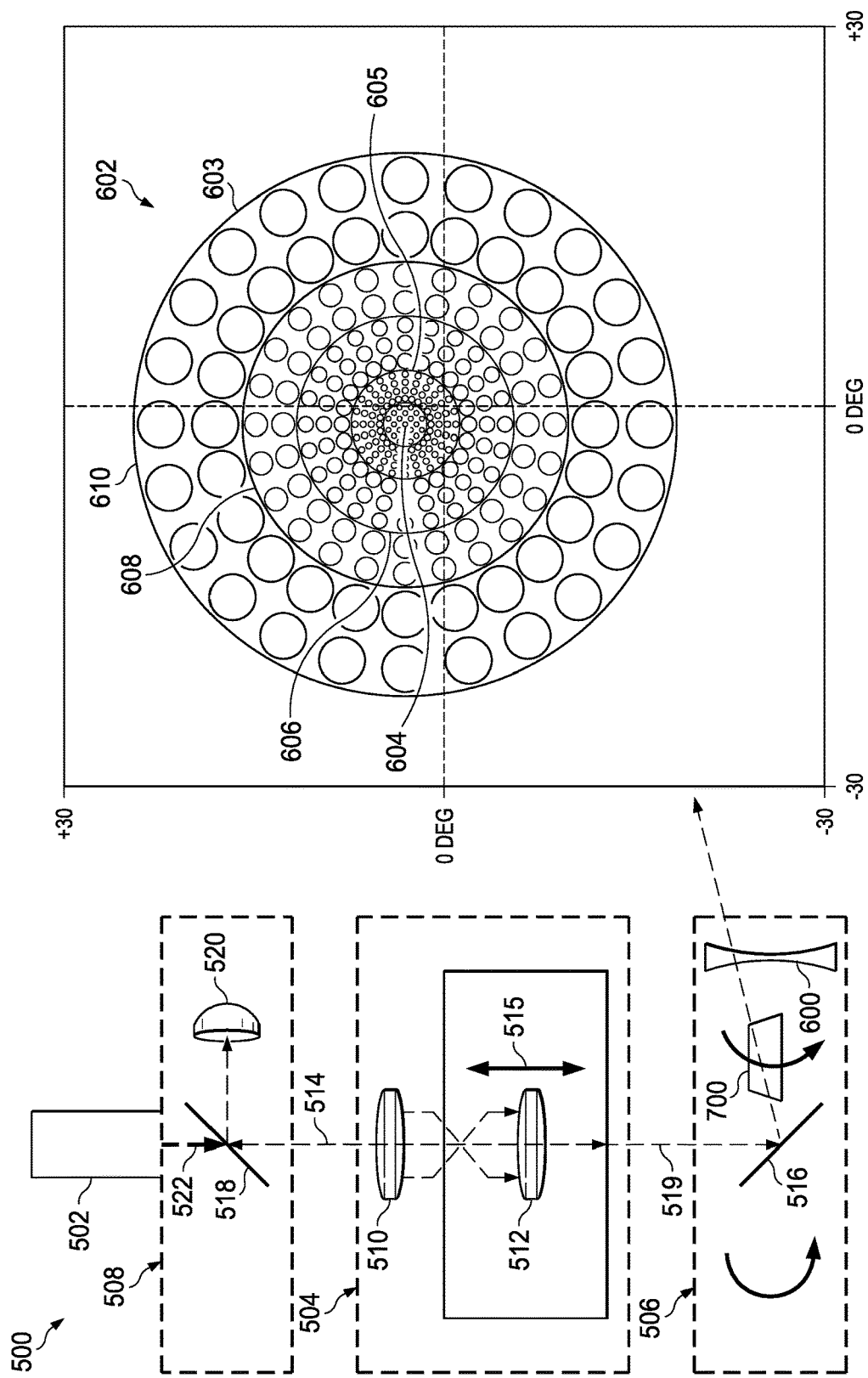
FIG. 7 is an illustration of a measurement system in accordance with an illustrative embodiment.

With reference now to FIG. 7, an illustration of a measurement system is depicted in accordance with an illustrative embodiment. In this illustrative example, measurement system 500 is yet another example of an implementation of measurement system 202 shown in block form in FIG. 2.

In this example, scanning system 504 also includes dove prism 700. Dove prism 700 rotates about one axis. As depicted, scanning mirror 516 rotates about one axis instead of about two axes. In this illustrative example, dove prism 700 rotates on a different axis from scanning mirror 516.

Rotation of dove prism 700 causes laser beam 522 to be emitted in a circular pattern in target region 603. The change of the rotation of scanning mirror 516 causes the scan angle of laser beam 522 to change in a radial direction from center 604 in target region 603.

Figure 8:
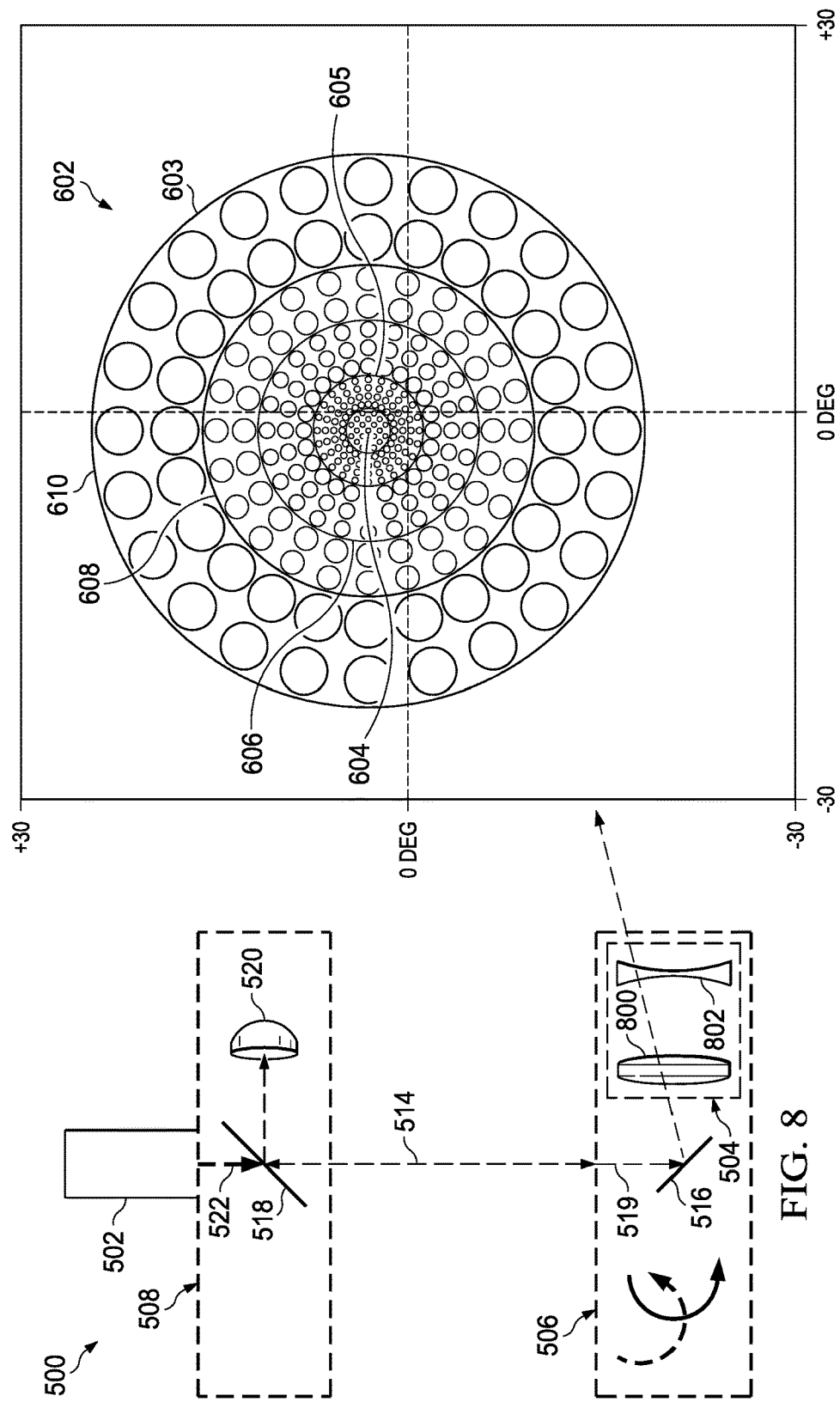
FIG. 8 is an illustration of a measurement system in accordance with an illustrative embodiment.

Turning to FIG. 8, an illustration of a measurement system is depicted in accordance with an illustrative embodiment. In this illustrative example, measurement system 500 is another example of implementation of measurement system 202 shown in block form in FIG. 2.

In this illustrative example, lens 800 and divergence lens 802 are part of scanning system 506. Lens 800 and divergence lens 802 are also part of focusing system 504.

Scanning mirror 516 rotates on two axes to direct laser beam 522 through different sections of divergence lens 802. Divergence lens has different levels of divergence in different sections of divergence lens 802.

As a result, the divergence of laser beam 522 may be set based on the particular section through which laser beam 522 passes through divergence lens 802. Further, the different sections of divergence lens 802 also deflect laser beam 522 to direct laser beam 522 to one of locations 602 in target region 603.

Thus, the different scanning densities as shown for locations 602 in target region 603 are obtained based on the particular section through which laser beam 522 passes through divergence lens 802. For example, the center of divergence lens 802 has a lower divergence as compared to the periphery of divergence lens 802.

The illustration of the different configurations for measurement system 500 in FIG. 5-8 are shown as examples of implementations for measurement system 202 shown in block form in FIG. 2 and are not meant to limit the manner in which measurement system 500 may be implemented in other examples. For example, lens 800 may omitted in other examples of measurement system 500. In still other illustrative examples, target regions may take other shapes other than the rectangle shape for target region 524 and the circle shape for target region 603. The shape of a target region may be, for example, an irregular shape, a quadrilateral, a pentagon, or some other suitable shape.

Additionally, other configurations of sections for different resolutions may be used in addition to or in place of the one shown for target region 524 and target region 603. For example, a target region may have two separate areas in which the change in the scan angle and divergence of laser beam 522 are the smallest. For example, two noncontiguous regions with the highest resolution may be present in the target region.

In still another illustrative example, the shape, size, and sections with selected resolutions may change from one scan to another scan. For example, the highest resolution may be central in a circular target region. If movement of an object is identified at the periphery of the target region, the change in the scan angle and the divergence may be such that the smallest change in the scan angle and divergence are located at the periphery where movement of the object is detected.

In this manner, the resolutions may change dynamically from one scan to another scan of the target region. Additionally, the target region itself also may be changed to have at least one of a different shape or different size.

Figure 9:
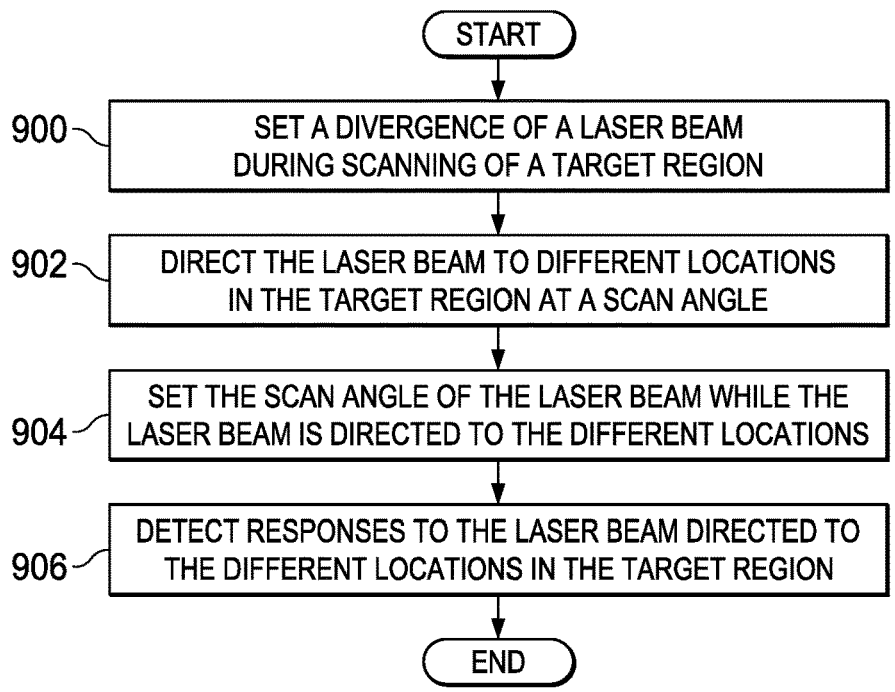
FIG. 9 is an illustration of a flowchart of a process for scanning a target region in accordance with an illustrative embodiment.

With reference now to FIG. 9, an illustration of a flowchart of a process for scanning a target region is depicted in accordance with an illustrative embodiment. The process illustrated in FIG. 9 may be implemented in measurement environment 200 in FIG. 2. For example, the process may be implemented in measurement system 202 to scan target region 218 in FIG. 2.

The process begins by setting a divergence of a laser beam during scanning of a target region (operation 900). Setting the divergence in operation 900 may include no divergence, a positive divergence, or a negative divergence. In this manner, the diameter of the laser beam may be controlled for when the laser beam reaches the target region. In this illustrative example, the target region may be an area that is a selected distance away from the measurement system.

The process directs the laser beam to different locations in the target region at a scan angle (operation 902). The process sets the scan angle of the laser beam while the laser beam is directed to the different locations (operation 904). In operation 904, the scan angle is changed for each pulse of the laser beam.

Changing at least one of the amount of change in the scan angle or the divergence during scanning of the target region changes a resolution for the target region. The amount of change in the scan angle and the divergence are set such that the divergence is based on the amount of change in the scan angle, or the amount of change in the scan angle is based on the divergence. In the illustrative example, at least one of the amount of change in the scan angle or the divergence is set such that the change in the number of degrees in the scan angle is about equal to a number of degrees for the divergence.

In this illustrative example, operation 900, operation 902, and operation 904 or not shown any particular order. These operations may be performed at substantially the same time. Additionally, some of the operations may be performed at substantially same time, before or after another operation, or in some other order.

The process detects responses to the laser beam directed to the different locations in the target region (operation 906) with the process terminating thereafter. These operations form a single scan of the target region. The different operations may be repeated to perform additional scans of the target region.

The responses detected in operation 906 may be used to perform a number of operations. The number of operations is selected from at least one of generating an image of the target region, identifying distances to objects in the target region, identifying objects in the target region, controlling movement of a platform, moving an object, manipulating an object detected in the target region, or some other suitable operation.

Figure 10:
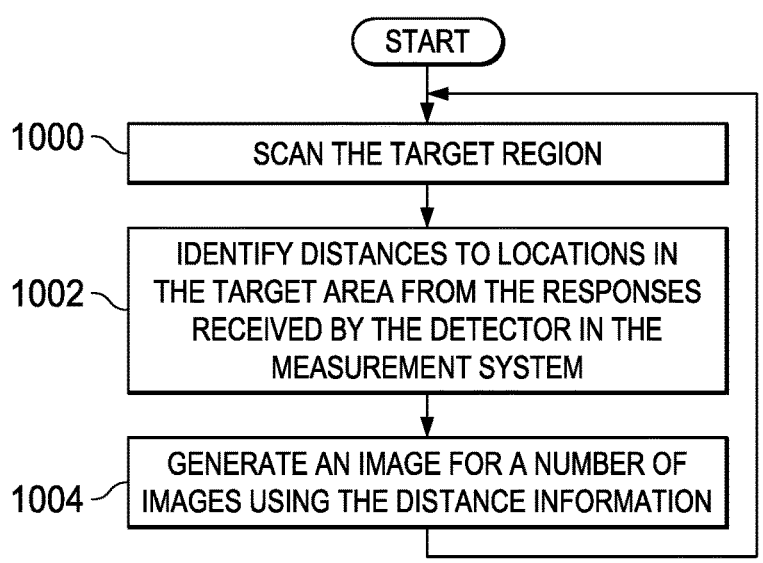
FIG. 10 is an illustration of a flowchart of a process for generating information from scanning a target region in accordance with an illustrative embodiment.

With reference now to FIG. 10, an illustration of a flowchart of a process for generating information from scanning a target region is depicted in accordance with an illustrative embodiment. The process illustrated in FIG. 10 may be implemented in measurement environment 200. For example, different operations may be implemented in controller 212. In other illustrative examples, a computer or other data processing system may receive the information from the measurement system and process the information.

The process begins by scanning the target region (operation 1000). Operation 1000 may be implemented using the different operations described in FIG. 9 to generate information about the target region. In this illustrative example, operation of 1000 is performed to generate information that may be used in an image of the target region.

The process then identifies distances to locations in the target area from the responses received by the detector in the measurement system (operation 1002). In operation 1002, the process may identify the time-of-flight (TOF) based on the time when a response is received from the time when the laser beam was emitted that generates the response. Additionally, the intensity of the response also may be used to identify the distance. These distances are information about the target region derived from the responses.

The process then generates an image for a number of images using the distance information (operation 1004) with the process then returning to operation 1000. In operation 1004, each distance identified forms a pixel that corresponds to a location in the target region. The image may have different resolutions in different portions of the image. This image is also considered information that is generated from the responses.

Figure 11:
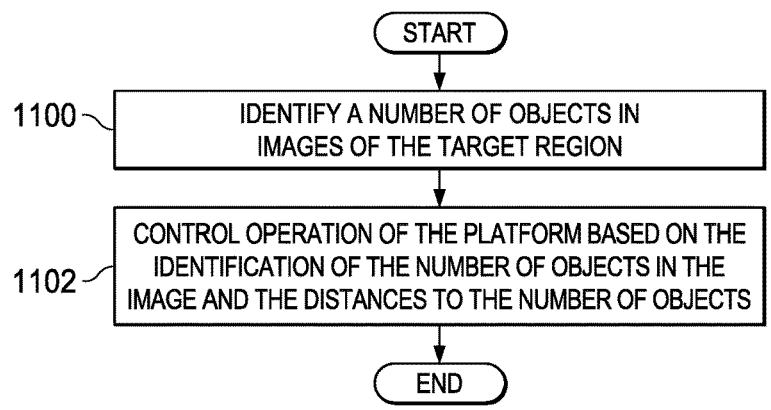
FIG. 11 is an illustration of a flowchart of a process for operating a platform in accordance with an illustrative embodiment.

With reference next to FIG. 11, an illustration of a flowchart of a process for operating a platform is depicted in accordance with an illustrative embodiment. The process illustrated in FIG. 11 may be implemented in measurement environment 200. For example, the process may be implemented in platform 242 using measurement system 202. Controller 212 may also control operation of platform 242 and may perform the different operations depicted in this flowchart. In other illustrative examples, a separate controller or other type of device present to control operation of the platform may perform these operations.

The process begins by identifying a number of objects in images of the target region (operation 1100). The process then controls operation of the platform based on the identification of the number of objects in the image and the distances to the number of objects (operation 1102) with the process terminating thereafter.

For example, when the platform as a mobile robot in a manufacturing facility, the operation may be to control navigation of the robot to a destination, drill a hole in the workpiece, fasteners, inspect the part, or some other suitable operation. As another example, when the platform is a self-driving car, and operation may be to maintain distance from another car, change lanes, or some other suitable operation.

Figure 12:
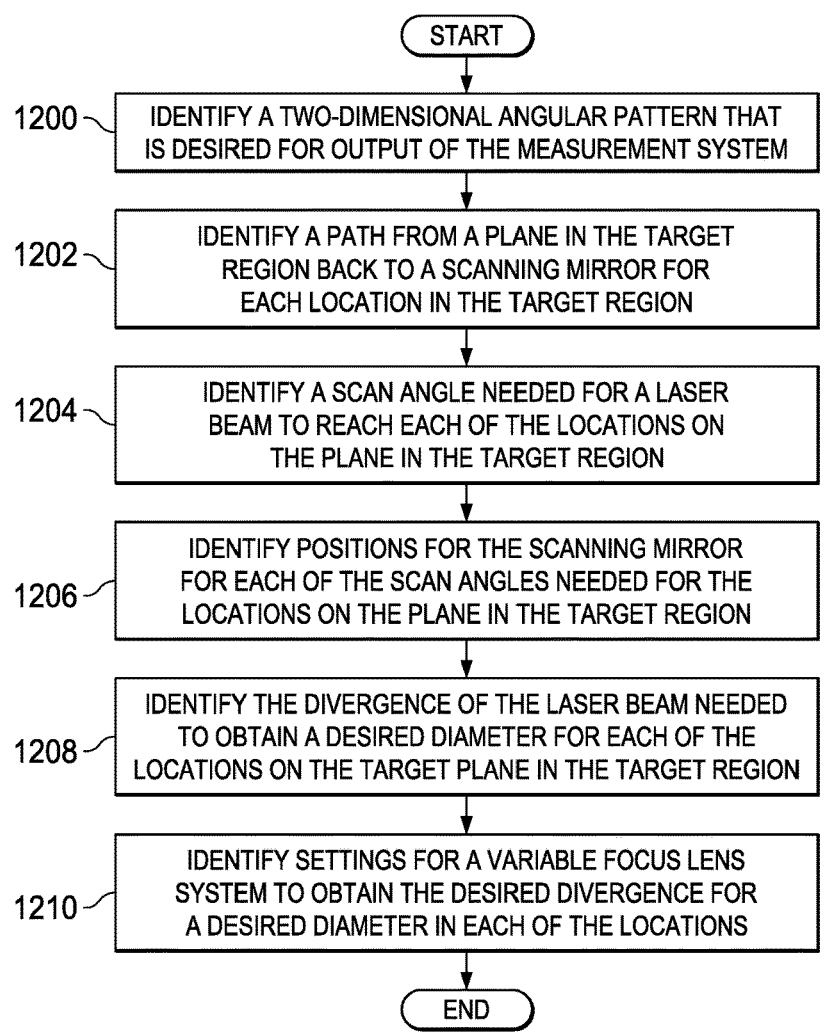
FIG. 12 is an illustration of a flowchart of a process for selecting components for a measurement system in accordance with an illustrative embodiment.

With reference to FIG. 12, an illustration of a flowchart of a process for selecting components for a measurement system is depicted in accordance with an illustrative embodiment. The process illustrated in FIG. 12 may be used to identify parameters for components in scanning system 206 and focusing system 208 in FIGS. 2-4. For example, this process may be used to identify parameters when a spherical lens is used in focusing system 208. More specifically, this process may be used with focusing system 208 including first lens 300 and second lens 302 implemented using spherical lenses.

The process begins by identifying a two-dimensional angular pattern that is desired for output of the measurement system (operation 1200). This two-dimensional angular pattern is a pattern of locations on a plane in a target region. For example, the pattern of locations 526 and target region 524 in FIG. 5 and the pattern of locations 602 in target region 603 in FIG. 6 are examples of two-dimensional angular patterns.

For each location in the target region, the process then identifies a path from a plane in the target region back to a scanning mirror (operation 1202). The path also may include any optical elements, such as lenses that may be between the location in the target region and the scanning mirror. In one illustrative example, the scanning mirror is the first element to deflect the laser beam in one axis or two axes. Lenses that pass the laser beam to the scanning mirror change the divergence of the laser beam, but are not used to deflect the laser beam in the illustrative example. The deflection steers the laser beam in a desired direction.

A rotating dove prism also may be used to deflect the laser beam from the optical axis. This deflection may be performed, for example, by either tilting the dove prism or by deflecting the beam with a scanning mirror prior to the laser beam reaching the dove prism. The scanning mirror and dove prism may both rotate such that only a single axis of rotation is needed for the scanning.

The process then identifies a scan angle needed for a laser beam to reach each of the locations on the plane in the target region (operation 1204). The process then identifies positions for the scanning mirror for each of the scan angles needed for the locations on the plane in the target region (operation 1206).

The process identifies the divergence of the laser beam needed to obtain a desired diameter for each of the locations on the target plane in the target region (operation 1208). Operation 1208 identifies changes to the divergence of the laser beam that may be needed to obtain the desired diameters. The process then identifies settings for a variable focus lens system to obtain the desired divergence for a desired diameter in each of the locations (operation 1210) with the process terminating thereafter.

This process identifies parameters for scan angles and divergence. These parameters may then be used to operate measurement system 202 in FIG. 2 to obtain a desired pattern of locations 220 in target region 218 in. The pattern also includes a desired diameter for a laser beam reaching a plane in target region 218. For example, these parameters may be used to control movement of a lens, such as second lens 302 and focusing system 208 shown in block form in FIG. 3.

Figure 13:
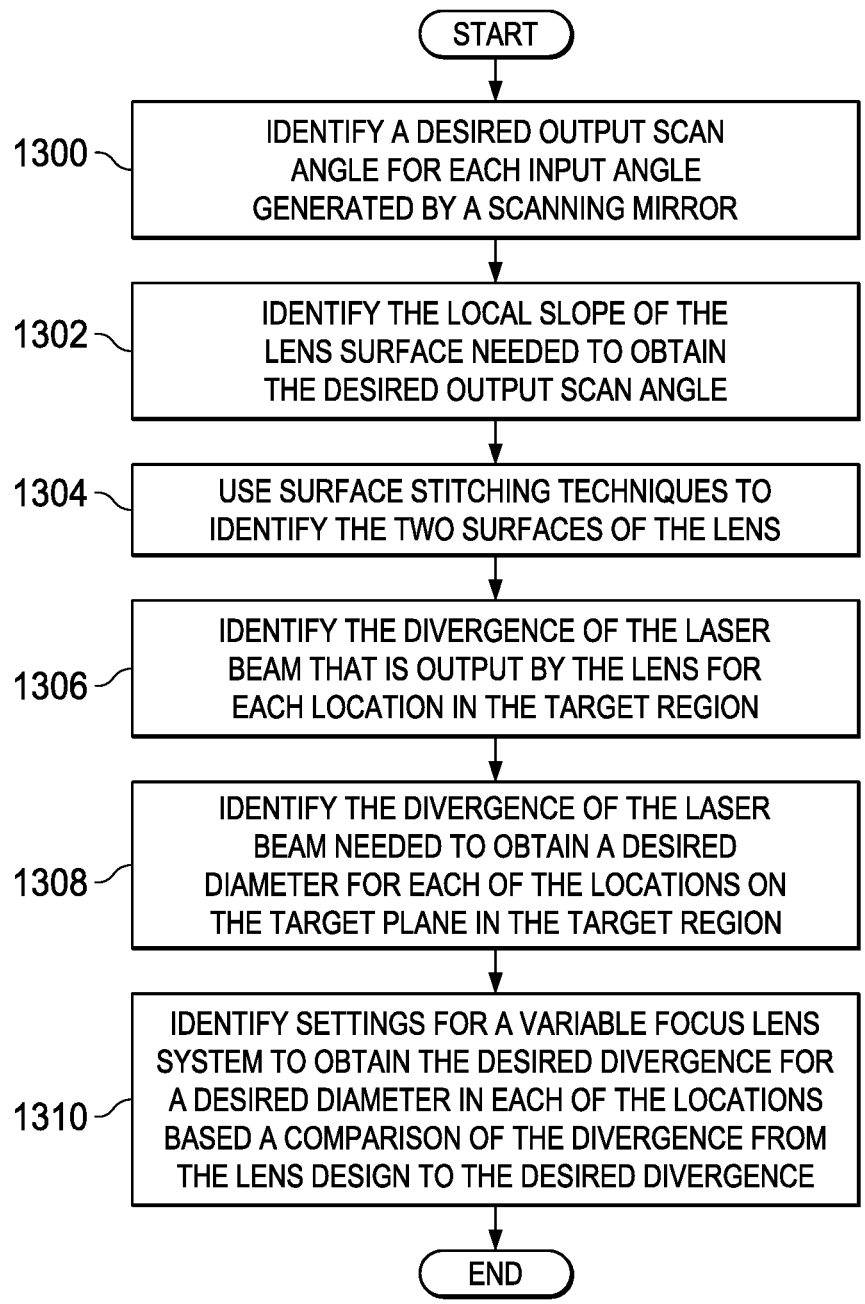
FIG. 13 is an illustration of a flowchart of a process for selecting components for a measurement system in accordance with an illustrative embodiment.

With reference to FIG. 13, an illustration of a flowchart of a process for selecting components for a measurement system is depicted in accordance with an illustrative embodiment. The process illustrated in FIG. 13 may be used to identify parameters for components in scanning system 206 and focusing system 208 in FIGS. 2-4. This process may also be used to identify parameters when an arbitrary lens is used. An arbitrary lens may be used when a more complicated or non-circular pattern is desired.

The process begins by identifying a desired output scan angle for each input angle generated by a scanning mirror (operation 1300). The desired output scan angle is an angle used to direct a laser beam to a location in the target region.

The process then identifies the "local slope" of the lens surface needed to obtain the desired output scan angle (operation 1302). The "local slope" is the angle between the central ray of the optical beam and the tangential surface of the optical element at that 'local' point where the ray exits the optical element. Operation 1302 may be performed using currently known ray tracing techniques, such as Snell's Law.

The process uses surface stitching techniques to determine the two surfaces of the lens (operation 1304). The two surfaces are the surfaces on each side of the lens. The surface stitching techniques may be, for example, bi-cubic spline approximations.

The process identifies the divergence of the laser beam that is output by the lens for each location in the target region (operation 1306). The process identifies the divergence of the laser beam needed to obtain a desired diameter for each of the locations on the target plane in the target region (operation 1308).

The process then identifies settings for a variable focus lens system to obtain the desired divergence for a desired diameter in each of the locations based a comparison of the divergence from the lens design to the desired divergence (operation 1310) with the process terminating thereafter. These parameters may be used to set movement of a lens, such as second lens 302 and focusing system 208 shown in block form in FIG. 3.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
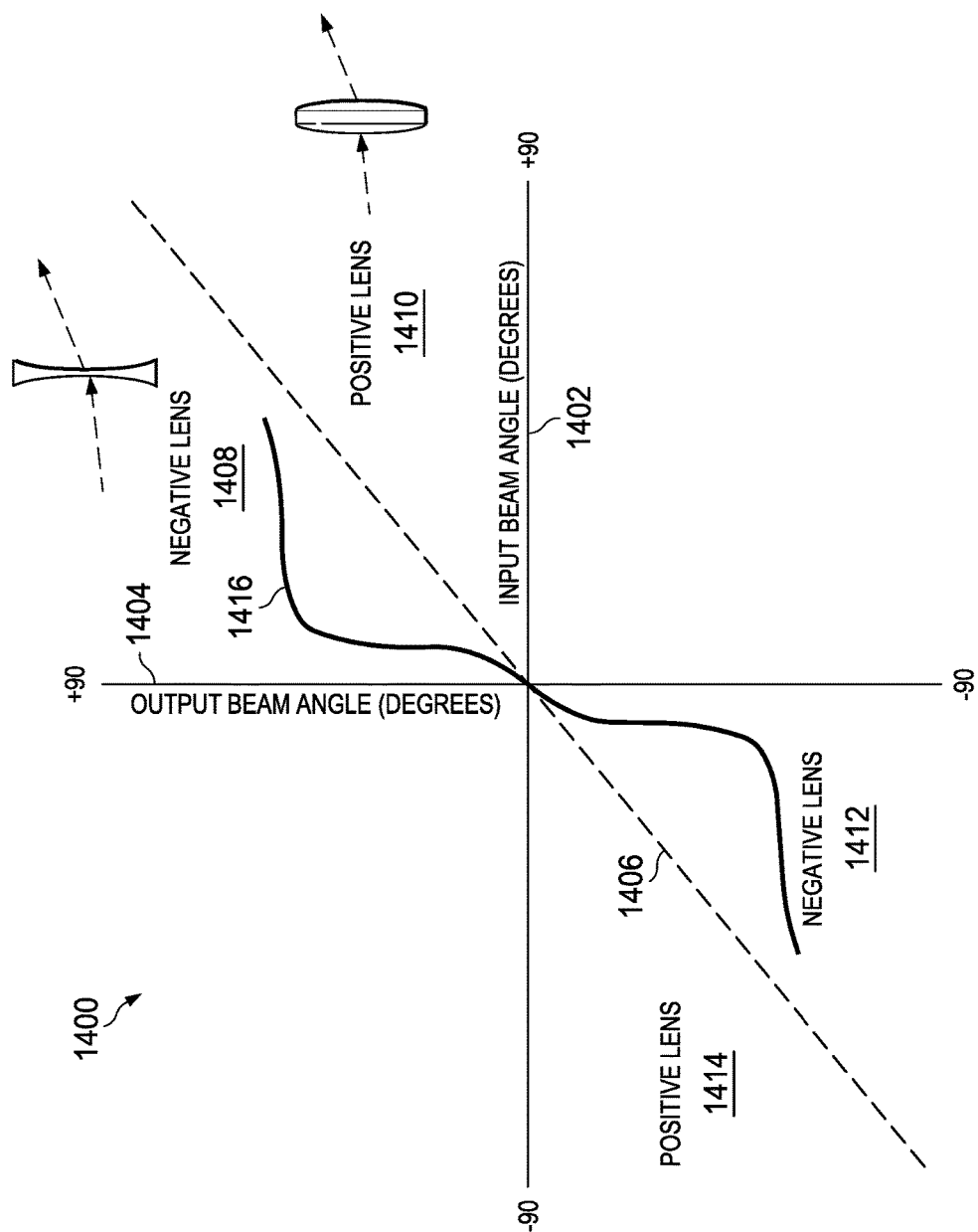
FIG. 14 is an illustration of a graph of a desired input versus an output angle plot for a lens in accordance with an illustrative embodiment.

With reference next to FIG. 14, an illustration of a graph of a desired input versus an output angle plot for a lens is depicted in accordance with an illustrative embodiment. In this illustrative example, in graph 1400, x-axis 1402 is the input laser beam angle into a lens in degrees, and y-axis 1404 is the output laser beam angle out of the lens in degrees. The output laser beam angle is the scan angle for the laser beam.

Line 1406 represents the division between a negative lens and a positive lens. Section 1408 is a negative lens, section 1410 is a positive lens, section 1412 is a negative lens, and section 1414 is a positive lens. The indication of the positive lens or the negative lens is an indication of the type of lens needed for a particular input laser beam and output laser beam. The lens arrangement may be such that the divergence of the beam increases as the beam angle increases relative to the optical axis. In this illustrative example, the lens described may be a general description of an optical telescope, and the lenses are selected to achieve this result. The laser scan pattern, spacing between pulses, may be selected such that the spacing matches the varying divergence of the beam.

In calculating the shape of a lens, currently standard ray tracing programs may be used to generate the surface of the lens. The program may be, for example, Code V®, which is available from Synopsis, Inc. "Code V" is a registered trademark of Synopsis, Inc. Zemax Optical Studio, available from Zemax, LLC, is another example of a ray tracing program that may be used. The inputs may be the angles from the source location, the placement of the optical element, and the output angle required from each input angle. Additionally, the shape of the surface of the lens may also be calculated from basic optical principles using the ABCD matrix analysis or Snell's law.

As depicted, line 1416 is a scan pattern based on the input laser beam angle and the output laser beam angle. Line 1416 indicates the type of lens that is needed and the output angle that is needed.

Thus, the illustrative embodiments provide a method and apparatus for obtaining information about a target region. In one illustrative example, a beam of coherent light in the form of a laser beam may be directed to different locations in the target region to form a scan of the target region.

Responses to the scan may be used to obtain information about the target region. For example, distances of two different locations may be used to identify whether objects are present in the target region. The presence of different objects may be used to manage the operation of a platform such as a mobile robot in a manufacturing facility, a self-driving car in a city, an unmanned aerial vehicle surveying a land area, or other platforms.

With the changing at least one of an amount of change in the scan angle or the divergence of the laser, different resolutions may be obtained for the target region. With scanning the target region with different resolutions, maintaining a frame rate may be possible as compared to current lidar systems in which all of the target region is scanned at a higher resolution. Additionally, with different resolutions, the amount of information that is present for processing may be reduced. As result, faster generation of images, identification of objects, and other types of processing may occur.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

The description of the different illustrative embodiments has been presented for purposes of illustration and description and is not intended to be exhaustive or limited to the embodiments in the form disclosed. Many modifications and variations will be apparent to those of ordinary skill in the art.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a light source that emits a laser beam during an operation of the light source;
a scanning system that directs the laser beam to a target region and sets a scan angle of the laser beam while scanning of the target region occurs;
a focusing system that sets a divergence of the laser beam while scanning of the target region occurs, wherein the focusing system comprises:
a first lens on an optical axis, wherein the laser beam passes through the first lens along the optical axis; and
a second lens moveable on the optical axis, wherein the laser beam passes through the second lens after passing through the first lens and, wherein, the divergence of the laser beam directed to the target region is changed by movement of the second lens along the optical axis;
wherein changing at least one of an amount of change in the scan angle or the divergence of the laser beam while scanning the target region changes a resolution within the target region, and wherein the scanning system and focusing system are configured to scan different locations within the target region with different resolutions in a same scan of the target region, wherein resolution is inversely proportional to the amount of change in the scan angle and divergence of the laser beam.

2. The apparatus of claim 1, wherein the amount of change in the scan angle and the divergence are set such that the divergence is based on the amount of change in the scan angle or the amount of change in the scan angle is based on the divergence.

3. The apparatus of claim 1, wherein at least one of the amount of change in the scan angle or the divergence is set such that a change in a number of degrees in the scan angle from one location to another location in the target region is about equal to a number of degrees for the divergence.

4. The apparatus of claim 1, wherein the scanning system directs the laser beam to locations in the target region and further comprising:
a detector that detects responses to the laser beam directed to the locations in the target region, wherein distances to the locations in the target region are identified using the responses.

5. The apparatus of claim 1, wherein the second lens is selected from one of a convergent lens and a divergence lens.

6. The apparatus of claim 1, wherein the focusing system comprises:
a divergence lens that has different levels of divergence in different sections of the divergence lens, wherein the divergence of the laser beam reaching a location in the target region is set based on which section in the different sections that the laser beam passes through the divergence lens.

7. The apparatus of claim 6, wherein the scanning system directs the laser beam to the different sections of the divergence lens.

8. The apparatus of claim 1, wherein the scanning system comprises:
a number of mirrors moveable about a number of axes.

9. The apparatus of claim 1, wherein the scanning system comprises:
a dove prism rotatable about an axis.

10. The apparatus of claim 1, wherein the laser beam has a wavelength selected from about 10 nm to about 700 nm.

11. The apparatus of claim 1, wherein the light source, the scanning system, and the focusing system form a measurement system and further comprising:
a platform, wherein the measurement system is associated with the platform, wherein the platform is selected from one of a mobile platform, a stationary platform, a land-based structure, an aquatic-based structure, a space-based structure, a mobile robot, a vehicle, a self-driving car, an aircraft, an unmanned aerial vehicle, a surface ship, a tank, a personnel carrier, a spacecraft, a space station, a handheld device, a wearable device, and a satellite.

12. A method for scanning a target region, the method comprising:
setting a divergence of a laser beam during scanning of the target region by sending the laser beam along an optical axis through a first lens and subsequently through a second lens on the optical axis, and moving the second lens along the optical axis to change the divergence of the laser beam directed to the target region;
directing the laser beam to different locations in the target region at a scan angle;
setting the scan angle of the laser beam while the laser beam is directed to the different locations, wherein changing at least one of the divergence or an amount of change in the scan angle during scanning of the target region changes a resolution for the target region; and
scanning different locations within the target region with different resolutions in a same scan of the target region, wherein resolution is inversely proportional to the amount of change in the scan angle and divergence of the laser beam.

13. The method of claim 12 further comprising:
detecting responses to the laser beam directed to the different locations in the target region.

14. The method of claim 13, wherein the responses are used to perform a number of operations selected from at least one of generating an image of the target region, identifying distances to objects in the target region, identifying objects in the target region, or controlling movement of a platform.

15. The method of claim 12, wherein setting the divergence of the laser during scanning of the target region includes:
directing the laser beam through different sections of a divergence lens such that the divergence of the laser beam changes based on which section of the divergence lens the laser beam passes.

16. The method of claim 12, wherein a divergence lens is selected from one of a spherical, a cylindrical lens, and an aspherical lens.

17. The method of claim 12, wherein light is directed to the target region by a scanning system comprising at least one of a number of mirrors moveable about number of axes or a dove prism.

18. The method of claim 12, wherein the laser beam has a wavelength selected from about 10 nm to about 700 nm.

19. A measurement system comprising:
a light source that emits a beam of substantially coherent light;
a scanning system that directs the beam of substantially coherent light to a target region and sets a scan angle for the beam of substantially coherent light; and
a focusing system that adjusts a divergence of the beam of substantially coherent light while scanning of the target region occurs, wherein the focusing system comprises:
a first lens on an optical axis, wherein the beam passes through the first lens along the optical axis; and
a second lens moveable on the optical axis, wherein the beam passes through the second lens after passing through the first lens and, wherein, the divergence of the beam directed to the target region is changed by movement of the second lens along the optical axis;
wherein changing at least one of an amount of change in the scan angle or the divergence of the beam of coherent light while scanning the target region changes a resolution within the target region, and wherein the scanning system and focusing system are configured to scan different locations within the target region with different resolutions in a same scan of the target region, wherein resolution is inversely proportional to the amount of change in the scan angle and divergence of the beam.

20. The measurement system of claim 19 further comprising:
a detector that detects responses to the beam of substantially coherent light directed to a location in the target region, wherein distances to locations in the target region are identified using the responses.

21. The measurement system of claim 19, wherein at least one of the scan angle or the divergence is set such that a change in a number of degrees in the scan angle from one location to another location in the target region is about equal to a number of degrees for the divergence.

22. The measurement system of claim 20 further comprising:
a controller that identifies the distance to the locations in the target region using the responses and performs a number of operations selected from at least one of generating an image of the target region, identifying distances to objects in the target region, identifying objects in the target region, or directing movement of a platform with respect to the target region.

* * * * *